Inventor:
Thomas A. Vanderslice,
by John F. Ahern
His Attorney.

June 13, 1967  T. A. VANDERSLICE  3,324,729
METHOD AND APPARATUS FOR DETECTING LEAKS
Filed Sept. 14, 1964  2 Sheets-Sheet 2

Inventor:
Thomas A. Vanderslice,
by John F. Ahern
His Attorney.

United States Patent Office 3,324,729
Patented June 13, 1967

3,324,729
METHOD AND APPARATUS FOR DETECTING LEAKS
Thomas A. Vanderslice, Schenectady, N.Y., assignor to General Electric Company, a corporation of New York
Filed Sept. 14, 1964, Ser. No. 396,005
6 Claims. (Cl. 73—40.7)

The present invention relates to a method and apparatus for detecting leaks in evacuated systems, and more specifically relates to a method and apparatus using a vacuum pump of the ionic type as a leak detector.

In modern technology, evacuated systems and devices have many diversified applications. In any use of a vacuum system or device, it is of critical importance to determine, prior to sale or use, that it is not only properly evacuated but also that it is properly sealed without leaks. Therefore, leak detectors of various types have become common for use upon completion of the manufacture of vacuum devices. Most leak detectors, as known in the prior art, must be attached to the vacuum system at a point distinct from the vacuum pump connection, thereby providing an additional weakened portion in the system which is susceptible to breaking or developing a leak. Furthermore, many of the prior art leak detectors involve complex structures which increase the expense of manufacture of the vacuum system and many also require the use of helium which is a relatively rare and expensive gas.

Devices have been proposed which enable leak-checking to be carried on by the vacuum pumping system, but such devices have, in general, been relatively inefficient and have not been usable to attain the degree of evacuation required in many modern applications. Furthermore, they have been incapable of checking for very small leaks.

The present invention relates to overcoming the above-mentioned difficulties by providing an improved leak detector which is simple and inexpensive and which is also more efficient than previously known devices.

It is therefore an object of the present invention to provide an improved leak detector which is highly efficient.

It is a further object of the present invention to provide an improved leak detector which is simple and inexpensive.

A further object of the present invention is the provision of an improved vacuum pump-leak detector arrangement.

A specific object of the present invention is the provision of a method of using an ion pump of the ion-collector type as a leak detector.

Briefly, in accordance with one form of the present invention, a "triode type" ion pump, of the type described in my U.S. Patent No. 3,080,104, issued Mar. 5, 1963, is used to evacuate the system to be checked for leaks. The "triode type" ion pump as referred to herein comprises cathode and anode electrodes between which electrons pass in magnetically-elongated paths to ionize gas molecules from the system. Ions created by electron-gas-molecule collisions land on the cathode with high energy, thereby sputtering cathode material. The sputtered material lands on a collector electrode which is closely disposed adjacent the cathode and preferably maintained at a positive electrical potential with respect thereto. The surfaces of the cathode and collector electrodes are constantly cleaned by transfer of ions from the cathode and by covering of the ions on the collector by sputtered material.

In the present invention, the above-described triode type ion pump is at least partially converted to diode-type operation by setting the collector at a potential which repels ions, for example at a potential at or slightly below anode potential. "Diode type" operation is that which would exist if the ion collector electrode were not present. In this condition, ions are not attracted to the collector with high velocity but may drift thereto. Noble gas is admitted to the system through any existing leaks. Since noble or inert gases are easily ionized but do not have a chemical affinity for combination with other elements, the inert gas ions are not removed from the system as rapidly as active gas ions which do have an affinity for such combination. The pumping efficiency with respect to inert gases is thereby decreased and the pressure within the device increases. This may be indicated by a measurable increase in anode current.

The novel features believed characteristic of the invention are set forth in the appended claims. The invention itself, together with further objects and advantages thereof, may best be understood by reference to the following description, taken in connection with the appended drawings in which:

Figure 1:
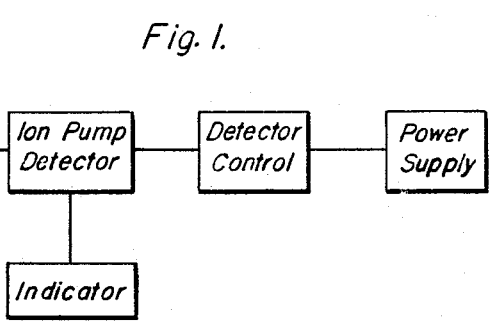
FIGURE 1 is a block diagram of an ion pump leak detector system made in accord with the present invention.

In FIGURE 1 the ion pump-detector system is shown in block form. Noble gas is sprayed over the vacuum system to be leak-checked. Any noble gas entering the system is collected in the ion pump. If the detector control is set in "pump" position the inert gas causes an increase in pressure, which results in an increase in anode current. This is reflected by an appropriate indication, either visible, audible or recorded. The detector control changes the pump-detector from one position to another in accord with voltages applied from the power supply to the anode cathode and collector electrodes of the ion pump-detector device.

Figure 2:
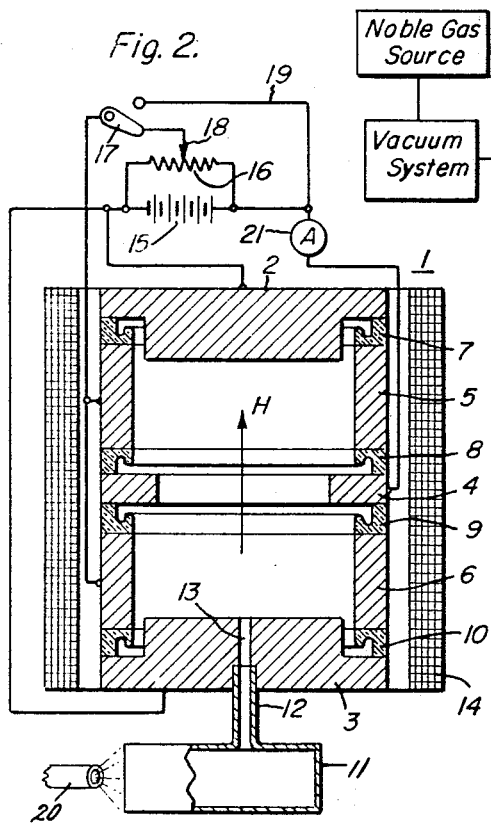
FIGURE 2 is a vertical cross section of a leak detector device constructed in accordance with the present invention.

In FIGURE 1, one detailed embodiment of the invention includes an ion pump 1 of the disk-seal type as is illustrated in detail in FIGURE 2 and having a plurality of electrodes, specifically cathode means comprising disk-shaped members 2 and 3, an apertured anode means 4 and annular collector means 5 and 6 juxtaposed closely adjacent respective cathode members 2 and 3. Each of the cathode and anode means possesses an annular portion at the periphery thereof, which is of substantially the same outside diameter as the outside diameter of annular collector means 5 and 6. Adjacent electrodes are separated by insulating ceramic annular members which are hermetically sealed to the adjacent electrodes to form an evacuable envelope. Thus, for example, member 2 is electrically separated from and hermetically sealed to collector means 5 by an annular insulating member 7, and collector means 5 is electrically separated from and hermetically sealed to anode means 4 by annular insulating member 8. Anode means 4 is likewise electrically separated from and hermetically sealed to collector means 6 by annular insulating member 9 and collector means 6 is electrically separated from and hermetically sealed to member 3 by insulating member 10.

Each of insulating members 7, 8, 9 and 10 has a cross-sectional area which defines at least one re-entrant portion having a surface which is not in line-of-sight relationship with any active surface portion of members 2 and 3. This is achieved in the device of FIGURE 1 by causing a counterbore to be cut in the annular insulating members and by cutting a recessed annulus in the base of each counterbore. Access to the ion pump, suitable for connecting the device to an evacuated system 11, the pressure of which is to be lowered to an extremely low value, is achieved by means of tubulation 12 which is connected with an orifice 13 in member 3.

A magnetic field, substantially normal to the plane of anode means 4 and indicated schematically by arrow H, is provided by electromagnetic coil 14. Alternatively, an annular permanent magnet, properly dimensioned so as to slip over the cylindrical envelope formed by the metallic and ceramic members comprising ion pump 1 and properly insulated therefrom so as not to electrically short circuit the electrodes thereof, may be utilized.

Operating potentials are supplied by a unidirectional voltage source as indicated generally by battery 15 and potentiometer 16. Anode means 4 is biased positively with respect to the cathode means, members 2 and 3, to a potential of several thousand, say 3000, volts. In operating the device as a vacuum pump, collector means 5 and 6 are biased positively with respect to members 2 and 3 but negative by a value approximately 1000 volts with respect to anode member 4 by connection through switch 17 to center tap 18 on potentiometer 16.

Alternatively, a suitable alternating current voltage source may be substituted for unidirectional voltage source 15. A suitable value for the magnetic field strength H, may be from several hundred to several thousand oersteds.

Members 2 and 3 are constructed of an active metal which is a good getter for chemically active gases and which further possesses the characteristic of being readily sputtered under positive ion bombardment. Such materials include titanium, zirconium, hafnium, and like materials. Likewise, anode means 4 is preferably constructed of such material although, since no sputtering occurs from the anode means, it may well be constructed of other materials. Anode means 4 may constitute an apertured disk as is illustrated in FIGURE 2 or may, alternatively, comprise a honeycomb or other like structure which contains a plurality of apertures. It is only necessary that it be permeable to the majority of electrons attracted thereto from cathode means 2 and 3. Preferably, anode means 4 and collector means 5 and 6 are composed of titanium so that annular insulating members 7, 8, 9 and 10 may be composed of a suitable titanium-matching ceramic as, for example, a forsterite such as described in Pincus Patent 2,912,340, issued Nov. 10, 1959. Assembly may be as described in Lafferty Patent 2,957,741, issued Oct. 25, 1960.

In the operation of the device of FIGURE 1 as a vacuum pump, when voltages as indicated hereinbefore are applied and a relatively low gas pressure as, for example, below $10^{-2}$ mm. of mercury is obtained within the device, a discharge is initiated between cathode means 2 and 3, on one hand, and anode means 4, on the other hand. Due to the fact that the electrons emitted by cold emission from the cathode means are subjected to parallel electric and magnetic fields, the electrons approach the anode means from the cathode means with a helical motion. Since the anode means is apertured and preferably comprises an apertured matrix, and since most of the electron flux is concentrated at the center of the device away from the periphery of the anode means by the magnetic field, most of the electrons emitted from the cathode means 2 and 3 pass through the aperture and approach the other cathode means from which they are repelled. The electrons, therefore, oscillate back and forth between the two cathode means and execute elongated curvilinear paths due to the parallel electric and magnetic fields. In traversing such elongated curvilinear paths, each electron has a high probability of undergoing an ionizing collision with a gaseous molecule. Eventually, however, any particular electron is collected at the anode means.

An ionizing collision between an electron and a molecule causes the creation of a positive gas ion and a freed electron which is also accelerated in an elongated curvilinear path and may enter into an ionizing collision. The positive ions created by such collisions are likewise affected by the electric and magnetic fields, but, because of their great mass, are accelerated directly toward the nearest cathode means and strike the electrode with an energy of the order of $10^3$ electron volts. These collisions of ions with the cathode means cause metallic particles of the cathode material to be ejected by cathode sputtering. Due to the high current density at the point where most positive ions strike the cathode means, the positive ions are generally ejected therefrom by further collisions of positive ions with the cathode means. The space within the ionic pump of FIGURE 2 is, therefore, filled with a large number of positive ions and sputtered metallic particles which originate from the cathode means. Both the positive ions and the sputtered metallic particles are eventually attracted to collector means 5 and 6. Positive ions are attracted to means 5 and 6 because these electrodes are negative with respect to the electron-ion plasma and the attraction is that of an electric field. Sputtered metallic particles from the cathode means migrate to collector means 5 and 6, not because of any electrical attraction, but because of the proximity of these electrodes to the cathode and the high probability of incidence thereupon during diffusion.

The potential of the collector means is deliberately chosen to be sufficiently negative with respect to the plasma to attract positive ions, but insufficiently negative to cause these ions to impinge upon the collector with sufficient force to cause any substantial sputtering therefrom. Specifically, the collector means 5 and 6 are about several hundred volts negative with respect to the electron-ion plasma. Thus, positive ions attracted to collector means 5 and 6 remain at the suface thereof until they are covered by sputtered cathode material. Once this occurs, the positive ions are completely removed from the pump volume, lowering the gas pressure therein. Concurrently, the metal sputtered upon collector means 5 and 6 covers up positive ions resting upon the surface thereof and, therefore, presents a clean surface which is ready to receive further attracted positive ions.

According to the present invention, leak detecting is performed by reducing the pumping efficiency of the ion pump for noble or inert gases. The present invention relies in part upon the difference in pumping efficiency for inert gases and active gases and more specifically upon the reduction in pumping efficiency for inert gases which arises upon such conversion. If the collector means be raised to at least 80% of anode potential, and preferably to anode potential, all removal of gas ions must take place at the cathode means. It is well known that, although both inert and active gases can be ionized, the noble or inert gases do not exhibit a chemical affinity for other elements. Active gases do exhibit such affinity and readily combine to form chemical compounds. If active gases are leaking into the system to which the ion pump described above is attached, switching the device to a condition, above described, which approaches "diode type" pump operation still leaves the efficiency sufficiently high to keep the system evacuated. This is true due to the fact that active gases chemically combine with the cathode material and are thereby removed. Inert gases are ionized and accelerated to the cathode means in the same manner, but they do not combine chemically with the cathode material. Therefore, the efficiency of removal of inert gases, dependent solely on ion entrapment is substantially reduced. When inert gas is sprayed over the system, specifically over a leaking area, the inert gas ions are only collected through actual burial by the sputtered material rather than by chemical combination. The efficiency of the diode type pump for inert gases is thus significantly less than that for active gases. With the collector voltage raised as described hereinbefore an increased pressure results due to an increased number of inert gas ions. These, in turn, result in an increased anode current which can be measured or, alternatively may operate to provide a visible or audible signal.

To accomplish the above-described detection in the embodiment illustrated, switch 17 is moved by the detector control of FIGURE 1 to connect the collector means 5 and 6 through lead 19 to the anode potential. Nozzle 20, connected to a source of inert or noble gas, such as argon, is provided to spray the system 11 with inert gas. Ammeter 21 measures any change in anode current, thereby providing an indication of the pressure increase. The pressure increase indicates the presence and size of a leak.

Use of a localized spray, by making nozzle 20 very small, enables the device to be used for detecting one leak at a time since active gases do not interfere with the measurement of inert gas admitted through a leak near the nozzle 20. After a leak has been found and marked, the inert gas present in the system may readily be removed by reconnecting the collector electrodes to the tap 18 of potentiometer 16, thereby restoring the efficiency of the "triode type" ion pump. Further investigation can then be made for other leaks and all leaks can be closed after the entire system has been checked.

Thus, two advantages of the present invention appear from the above discussion: although there may be a plurality of leaks in a given system, a localized spray of inert gas can be used to locate the leaks one at a time, since active gases entering through other leaks are removed efficiently and only the inert gas will provide an indication of increased pressure. Secondly, the present invention comprises a leak detector incorporated with the vacuum pumping system so that very simple, fast conversion from vacuum pumping to leak checking and back to vacuum pumping can be made.

Provisions may be made for appropriate adjustment of the potential of lead 19 so that the most inefficient operating position with respect to a chosen inert gas may be employed, the attachment to the anode potential being shown merely by way of example. For example, a variable resistance could be inserted in lead 19 to permit adjustment of the efficiency until a desired difference is reached.

Figure 3:
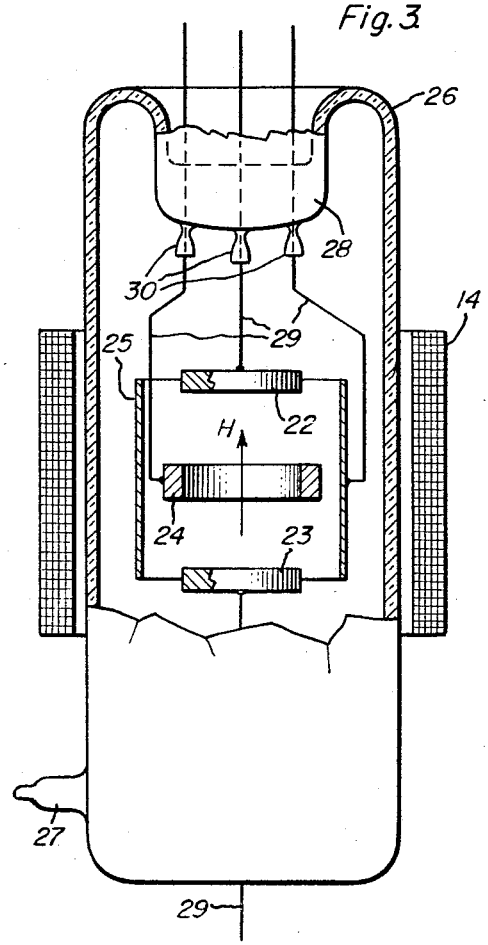
FIGURE 3 is a vertical cross section of an alternative embodiment of a leak detector constructed in accordance with the present invention.

In FIGURE 3 of the drawing there is illustrated an alternative embodiment of the device of FIGURE 1 wherein a conventional glass or vitreous envelope structure is utilized rather than the metal and ceramic disk-seal type construction of the device of FIGURE 2. In FIGURE 3, cathodes 22 and 23 and anode 24 correspond in basic structure and spatial arrangement to electrodes 2, 3 and 4 of FIGURE 2. Collector 25, however, comprises a continuous elongated right circular cylindrical electrode which is in close juxtaposition to both cathode 22 and cathode 23, and is substituted for the collector means 5 and 6 of FIGURE 2. Glass envelope 26 encloses the evacuated area and is provided with tubulation 27 for connection to a system to be evacuated and checked. Re-entrant portion 28 of envelope 26 provides means for the passage of electrical lead and support members 29 as is conventional in glass electron discharge devices. A breakdown shield 30 is built up upon each of the members 29 to prevent the occurrence of electrical arcs between the points at which these members enter the evacuated area. Leads 29 are externally connected to circuitry similar to that described with regard to FIGURE 2. Solenoid 14 establishes a magnetic field indicated by the arrow H which performs the same function as the field indicated in FIGURE 2.

The operation of this device is substantially the same as that of FIGURE 2, the important difference being that the envelope of FIGURE 3 is a vitreous material, such as glass, rather than ceramic and metal, and that the collector electrode is a single unitary annular member rather than a plurality of electrodes as shown in FIGURE 2. The latter feature could, of course, be utilized in a device such as shown in FIGURE 2, but the configuration shown is simpler to construct.

Figure 4:
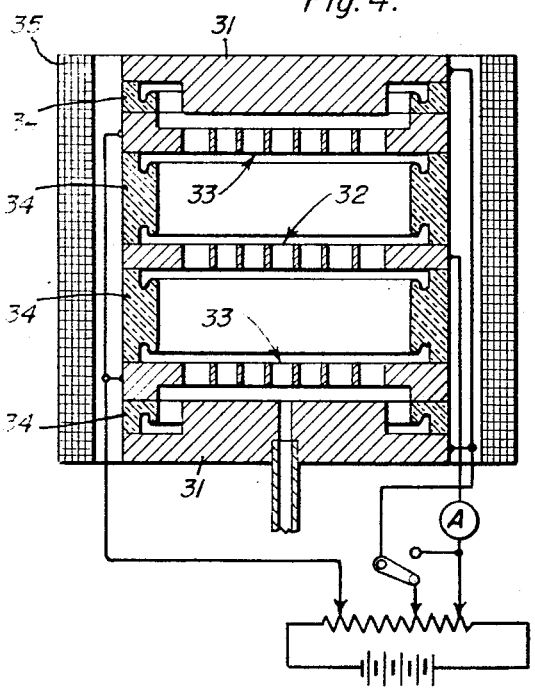
FIGURE 4 is a vertical cross-sectional view of another alternative embodiment of a leak detector constructed in accord with the present invention.

Another alternative form of the invention is shown in FIGURE 4 which illustrates another disk seal structure. In FIGURE 4 collector electrodes 31, anode 32 and cathodes 33 are the functional corrallaries of the anode, cathode and collectors of FIGURE 2. In FIGURE 4, however, anode 32 and cathodes 33 are composed of a plurality of ring or equivalent apertures and the collectors 31 are located behind cathodes 33 so as to be closely juxtaposed and allow cathodes 33 to pass ions through, minimizing erosion of the cathode and maximizing the proportion of ions which are urged to the collectors. Metallic particles are urged to the collectors by the kinetic energy with which they are removed from the cathodes by glancing impact of ions thereupon.

Figure 5:
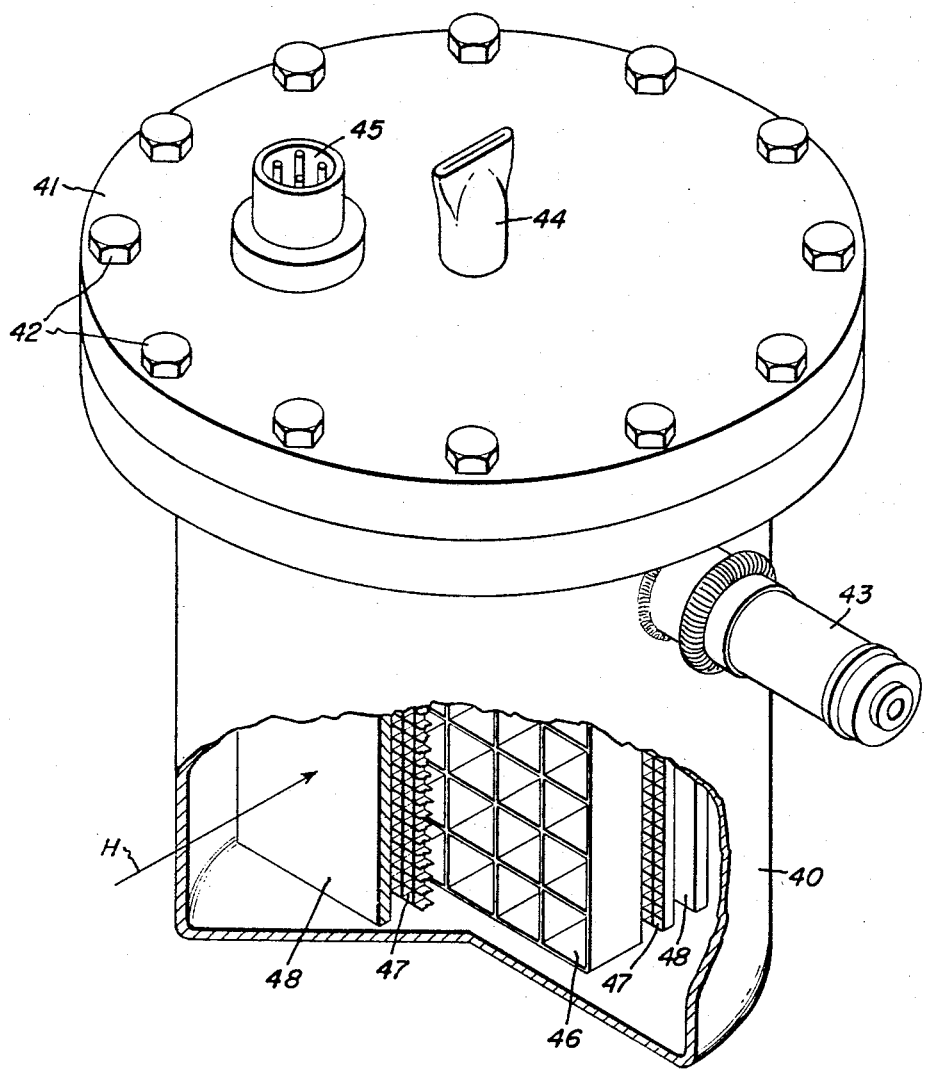
FIGURE 5 is a perspective view, with parts broken away of an alternative structure of an ionic pump suitable for use in the invention.

Still another alternative ionic pump structure which may be utilized in the practice of the invention is illustrated in FIGURE 5 of the drawing. In FIGURE 5, the evacuable envelope is comprised of flanged cylindrical can 40 and circular plate 41 which is fastened to the flanged top of can 40 by a plurality of bolts or stud screws 42. Plate 41 is removable so as to permit the pump electrode assembly to be removed and replaced if desired. Access to the evacuable envelope for connection to a system is provided by vacuum line 43. A pinch 44 is the means by which the pump is sealed, if evacuated after connection to the system. Electrical contact to the electrodes is provided by plug 45. The electrode assembly of the pump comprises an apertured honeycomb-like anode 46 flanked on either side by a smaller apertured honeycomb-type cathode 47, each of which is backed by a planar collector electrode 48. In operation, the device of FIGURE 4 is connected substantially as the ionic pumps illustrated in FIGURES 2 and 3. Typically, for triode type operation anode 46 may be 5000 volts positive with respect to cathodes 46, while collectors 47 are 3000 or 4000 volts positive with respect to cathodes 46. For diode type operation, the collectors 47 are raised to anode potential as with the embodiments of FIGURE 2 and FIGURE 3. All electrodes may conveniently be constructed of titanium or some other active gas gettering metal. A suitable magnetic field of several thousand oersteds field strength is represented by arrow H and may be provided by electromagnetic coils or permanent magnets, as is well known to the art.

It is apparent from the above description and drawing that there has been disclosed in several embodiments an improved leak detector system which may be embodied in the pumping system used to clear an evacuated device and which is simpler and less expensive to construct than previously known apparatus. Conversion of the ion pump from triode-type to diode-type operation by adjusting the collector to an appropriate potential creates an inefficiency of operation with respect to inert gases which may then be used to find any leaks present in the system. Reconversion of the pump back to triode operation insures final evacuation of the inert gases with a high degree of efficiency.

The specific embodiments described herein are presented merely as examples of the various forms the practice of this invention may take. Therefore, it is intended in the appended claims to cover all modifications and variations which may come with the true spirit and scope of this invention.

What I claim as new and desire to secure by Letters Patent of the United States is:

1. A method of detecting leaks in an evacuated system by using an ion pump adjustable to triode-type or diode-type operation comprising the steps of:
   (a) adjusting said pump to triode-type operation to cause said system to be evacuated;

(b) instantaneously converting said pump to diode-type operation so that said pump operates to maintain said system free of active gases, while allowing inert gas to accumulate in said system;

(c) directing a spray of inert gas against the exterior of said system so that said inert gas may enter said system through leaks therein;

(d) detecting any increase in pressure in said system due to accumulation of said inert gas;

(e) and thereafter instantaneously returning said pump to triode-type operation to clear said pump of inert gas and prepare for further testing.

2. A method of detecting leaks in an evacuated system by means of an ion pump comprising anode means, cathode means, and collector means, and means for applying operating potentials thereto, said methods comprising the steps of:

(a) adjusting the operating potential applied to said collector means to a point intermediate the potentials applied to said anode means and said cathode means to cause said pump to operate as a triode-type pump and evacuate said system;

(b) instantaneously converting said ion pump to diode-type operation by switching the potential applied to said collector means to a value of at least 80% of anode potential so that said pump is operated to maintain said system free of active gases while allowing inert gases to accumulate in said system;

(c) directing a spray of inert gas against the exterior of said system so that said inert gas enters said system through any leaks therein;

(d) detecting the increased pressure in said system due to accumulation of said inert gas;

(e) and thereafter instantaneously returning said pump to triode-type operation to clear said pump of inert gas and prepare for further testing.

3. Apparatus for detecting leaks in an evacuated system comprising:

(a) a triode type ion pump adapted to be connected to said system;

(b) means for instantaneously converting said pump to diode-type operation in which said pump operates to maintain said system free of active gases while allowing inert gases to accumulate therein and for instantaneously returning said pump to triode-type operation after a testing operation;

(c) means for directing inert gas against the exterior of said evacuated system while said pump is operating as a diode-type pump so that said gas may enter through any leaks in said system; and (d) means for detecting an increase in pressure within said system due to said introduction of inert gas through said leaks.

4. Apparatus as claimed in claim 3 wherein:

(a) said triode ion pump comprises anode means, cathode means and collector means, and means for applying an operating potential to said anode means, to said cathode means and to said collector means; and (b) said converting means comprises means for raising the potential of said collector to at least 80% of anode operating potential.

5. Apparatus for detecting leaks in an evacuated system comprising:

(a) an evacuable envelope connected to said system;

(b) anode means located within said envelope;

(c) cathode means located within said envelope and having a sputterable surface;

(d) said anode means and said cathode means being adapted to sustain a cold electron discharge therebetween for ionizing gas molecules;

(e) ion collector means, electrically insulated from said cathode means and said means, located adjacent said cathode means and including a substantial surface for the deposition of positive ions and sputtered material;

(f) means for applying operating potentials to each of said cathode, anode and collector means during evacuation to cause particles to be sputtered from said cathode means and deposited upon said collector means to thereby cover positive gaseous ions which are electrically attracted thereto;

(g) means for directing inert gas against the exterior of said evacuated system whereby said gas may enter through any leaks in said system;

(h) means for switching said operating potential applied to said collector means to a positive potential effective to repel positive gas ions so that said inert gas tends to accumulate in said system causing an increase in anode current and for switching said collector operating potential to a value to attract positive ions after a leak testing operation is completed; and (i) means for detecting the anode current increase due to said accumulation of said inert gas.

6. Apparatus as claimed in claim 5 wherein:

(a) said means for switching said operating potential applied to said ion collector means comprises means for raising said collector potential substantially to said anode operating potential.

References Cited

UNITED STATES PATENTS

| | | | |
|---|---|---|---|
| 2,526,038 | 10/1950 | Nelson | 73—40.7 X |
| 2,550,498 | 4/1951 | Rice | 73—40.7 X |
| 3,070,992 | 1/1963 | Nemeth | 73—40.7 |
| 3,076,139 | 1/1963 | Roberts | 73—40.7 X |
| 3,080,104 | 3/1963 | Vanderslice | 230—69 |
| 3,085,198 | 4/1963 | Briggs et al. | 73—40.7 X |

OTHER REFERENCES

"Use of an Ion Pump as a Leak Detector," J. R. Young. The Review of Scientific Instruments, January 1961, vol. 32, No. 1, p. 85.

LOUIS R. PRINCE, *Primary Examiner.*

J. NOLTON, *Assistant Examiner.*